United States Patent [19]

Takanashi et al.

[11] Patent Number: 5,241,376
[45] Date of Patent: Aug. 31, 1993

[54] CINEMATOGRAPHIC SYSTEM

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 686,462

[22] Filed: Apr. 17, 1991

[30] Foreign Application Priority Data

Apr. 17, 1990 [JP] Japan ................................ 2-100815
Jul. 16, 1990 [JP] Japan ................................ 2-187787

[51] Int. Cl.$^5$ ........................ H04N 3/10; H04N 9/07; G02F 1/135
[52] U.S. Cl. ........................ 358/41; 358/43; 358/44; 358/49; 358/55; 358/909; 359/68; 359/72; 359/250; 359/252; 359/255; 365/108; 365/112
[58] Field of Search ............ 358/41, 43, 44, 49, 358/55, 75, 209, 213.11, 213.13, 225, 471, 909; 365/112, 108; 359/72, 68, 250, 252, 255

[56] References Cited

U.S. PATENT DOCUMENTS 3,723,651  3/1973  Gorog ....................... 359/72
4,712,878  12/1987  Taniguchi .................. 359/68

FOREIGN PATENT DOCUMENTS 63-289707  11/1988  Japan .
2251813  10/1990  Japan .

Primary Examiner—Benjamin R. Fuller
Assistant Examiner—Scott A. Rogers
Attorney, Agent, or Firm—Lowe, Price, LeBlanc & Becker

[57] ABSTRACT

A cinematographic system records motion-picture images on an elongate information recording medium which includes either a charge storage layer or a light modulating layer. The recorded images are reproduced and projected onto a screen. If the charge storage layer is employed, the motion-picture images are recorded as corresponding electric charge images photoelectrically converted from optical images, and if the light modulating layer is employed, image information corresponding to the motion-picture images is recorded under an electric field depending on electric charge images photoelectrically converted from optical images.

10 Claims, 10 Drawing Sheets

CINEMATOGRAPHIC SYSTEM

BACKGROUND OF THE INVENTION

1. Field of the Invention

The present invention relates to a cinematographic system for recording and reproducing motion pictures with high resolution.

2. Prior Art

According to the well-known cinematographic system, the optical motion-picture image of a subject is recorded on a photographic film with a silver-salt light-sensitive photographic emulsion, and a positive print is produced by developing and fixing the negative film thus prepared. The motion pictures recorded on the positive print can be projected onto a screen by a projector. One recent cinematographic system projects television images with an increased number of scanning lines onto a screen.

The conventional motion-picture system fails to reproduce high-resolution images, and requires photographic films to be developed, fixed, and processed according to complex procedures.

The modern television system cannot reproduce high-resolution images even if the number of scanning lines used is increased. More specifically, the electron beams used in television camera tubes are of limited diameter, and hence image resolution cannot be increased by reducing the electron beam diameter. Since the capacitance of the target in the camera tubes increases with the surface area of the target, the image resolution cannot be increased either even if the target surface area is increased. Video signals indicative of moving images, which are produced by the television camera tubes, have frequencies ranging from several tens MHz to several hundreds MHz. These video signals will be poor in signal-to-noise ratio if the resolution is increased. Therefore, the television camera tubes cannot produce video signals of desired high quality and high resolution. Solid-state imaging devices for use in television cameras are also subject to limitations since it is difficult to obtain two-dimensional solid-state sensors with as many pixels as required to achieve desired levels of image quality and resolution.

SUMMARY OF THE INVENTION

It is an object of the present invention to provide a cinematographic system which can record and reproduce motion-picture images with high resolution.

According to the present invention, there is provided a cinematographic system comprising recording means for photoelectrically converting an optical image of a subject into an electric charge image and recording the electric charge image, reproducing means for reproducing an optical image from the recorded electric charge image, and projecting means for projecting the reproduced optical image onto a screen. The recording means comprises an information recording medium including a charge storage layer for recording the electric charge therein. The reproducing means comprises a light modulating layer disposed in facing relation to the charge storage layer, for reproducing the optical image from the electric charge image recorded in the charge storage layer.

According to the present invention, there is also provided a cinematographic system comprising recording means for photoelectrically converting an optical image of a subject into an electric charge image and recording image information under an electric field depending on the electric charge image, reproducing means for reproducing an optical image from the recorded image information, and projecting means for projecting the reproduced optical image onto a screen. The recording means comprises an information recording medium including a light modulating layer for recording the image information therein.

In each of the cinematographic systems, the recording means comprises color separating means for separating the optical image of the subject into optical images of different colors, and means for photoelectrically converting the optical images of different colors into electric charge images. The reproducing means comprises color synthesizing means for combining reproduced optical images of different colors into a colored optical image.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
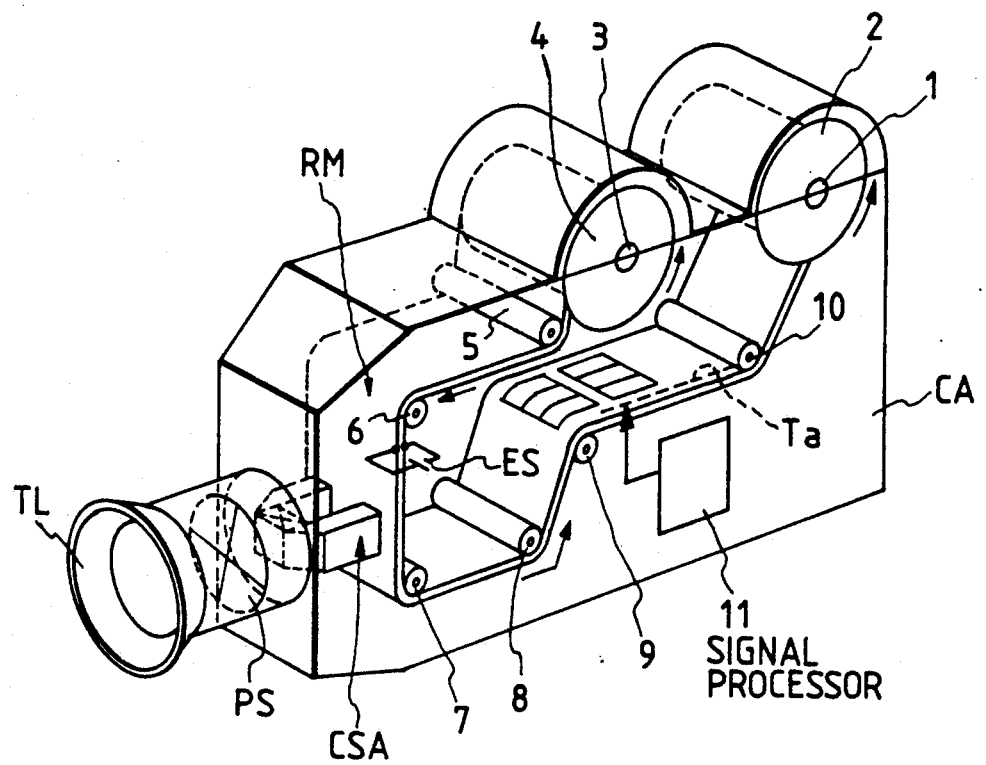
FIG. 1 is a schematic perspective view of a recording arrangement of a cinematographic system according to the present invention.

Like or corresponding parts are denoted by like or corresponding reference characters throughout views.

FIG. 1 shows a recording arrangement of a cinematographic system according to the present invention.

The recording arrangement shown in FIG. 1 comprises a casing CA, a lens TL mounted on the casing CA, an optical shutter PS associated with the lens TL, a trichromatic color separator CSA disposed in the casing CA behind the optical shutter PS, an information recording medium RM in the form of an elongate strip movably housed in the casing CA for longitudinal movement behind the trichromatic color separator CSA, and a voltage source (power supply) ES disposed in the casing CA for applying a electric field to a recording layer of the information recording medium RM when image information is recorded on the information recording medium RM. The information recording medium RM is wound around a takeup reel 2 rotatably supported in the casing CA by a shaft 1 and a supply reel 4 rotatably supported in the casing CA by a shaft 3.

The information recording medium RM is fed by a feed system which includes drive sprockets 6, 7 and guide rollers 5, 8, 9, 10. The casing CA also houses a signal processor 11 for recording audio information on the information recording medium RM.

The drive sprockets 6, 7 have teeth (not shown) engaging in perforations (not shown) in marginal edges of the information recording medium RM. The drive sprockets 6, 7 can be rotated by an intermittent drive mechanism (not shown) for intermittently feeding the information recording medium RM from the supply reel 4 to the takeup reel 2 so that each frame on the information recording medium RM can be held briefly behind the trichromatic color separator CSA. The intermittent drive mechanism may be of the known structure found in movie cameras and projectors.

The information recording medium RM has a marginal region Ta (indicated by the broken line in FIG. 1) for recording audio information therein. Desired audio information may be recorded in the recording region Ta by the signal processor 11 with light whose intensity has been modulated by the audio information. The signal processor 11 with such an optical recording system includes an audio signal processing circuit, a light source, a light modulator, and a light deflector. Alternatively, the recording region Ta may have a magnetic layer, and desired audio information may be magnetically recorded in the recording region Ta by the signal processor 11. In this case, the signal processor 11 comprises an audio signal processing circuit, a time-axis converting circuit, a control circuit, and a magnetic head.

In operation, the information recording medium RM is intermittently fed from the supply reel 4 to the takeup reel 2 across a position immediately behind the trichromatic color separator CSA. During each pause between intermittent movements of the information recording medium RM, the light from a subject (not shown in FIG. 1) passes through the lens TL and the optical shutter PS positioned therebehind, and is processed by the trichromatic color separator CSA into three color images, i.e., green, red, and blue images, which are then focused on a photoconductive layer PCL (described later on) of the information recording medium RM.

Figure 2:
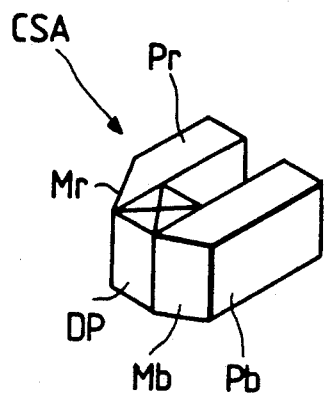
FIG. 2 is an enlarged perspective view of a trichromatic color separator in the recording arrangement shown in FIG. 1.

The trichromatic color separator CSA is shown in greater detail in FIG. 2.

As shown in FIG. 2, the trichromatic color separator CSA comprises a dichroic prism DP and a pair of prisms Pr, Pb disposed one on each side of the dichroic prism DP and having respective fully reflecting surfaces Mr, Mb. The green image produced by the dichroic prism DP passes directly through the dichroic prism DP and is focused on the photoconductive layer PCL (see FIG. 5, for example) of the information recording medium RM. The red image produced by the dichroic prism DP is reflected thereby into the prism Pr, and reflected by the fully reflecting surface Mr. The red image travels through the prism Pr and is focused on the photoconductive layer PCL. The blue image produced by the dichroic prism DP is reflected thereby into the prism Pb, and reflected by the fully reflecting surface Mb. The blue image travels through the prism Pb and is focused on the photoconductive layer PCL. The green, red, and blue images are focused on the photoconductive layer PCL in respective adjacent spaced areas thereon which are juxtaposed with guard bands therebetween.

The information recording medium RM may be either an information recording medium which includes a charge storage layer, as a recording layer, capable of storing or holding an electric charge image which is photoelectrically converted from and hence corresponds to an optical image, to be recorded, of a subject, or an information recording medium which includes a light modulating layer, as a recording layer, capable of modifying or modulating an optical property in an electric field pattern corresponding to an electric field charge image which is photoelectrically converted from and hence corresponds to an optical image, to be recorded, of a subject. More specifically, the charge storage layer is capable of storing or holding an electric charge image corresponding to optical image information to be recorded, over a long period of time. The light modulating layer is capable of modifying or modulating an optical property such as optical polarization, optical dispersion, birefringence, optical rotation, or the like in response to the application of a voltage thereto.

The charge storage layer may comprise a membrane made of a material having a high electric resistance, a membrane made of a material having a high electric resistance with charge holding particles dispersed therein, or the like. For example, the charge storage layer may be made of silicone resin, liquid crystal, PLZT, an electrochromic material, or the like. The light modulating layer may be made of (a) a material whose optical property is modified only when an electric field is applied thereto, such as lithium niobate, liquid crystal, high polymer - liquid crystal compound membrane, BSO, or PLZT, or (b) a material which can store the intensity of an applied electric field as a change in an optical property thereof and can emit light having an intensity depending on the stored field intensity in response to the application of light having a certain intensity, such as high polymer - liquid crystal compound membrane, liquid crystal, or dispersive PLZT.

Liquid crystal, PLZT, and high polymer - liquid crystal compound membrane, which are referred to above may be used as either the material (a) or the material (b) since their optical properties may be varied by different compositions and different structures.

The high polymer - liquid crystal compound membrane used as the light modulating layer as the recording layer may comprise a porous high polymer material having a volume resistivity of $10^{14}$ ωm or higher, such as methacrylic resin, polyester, polycarbonate resin, vinyl chloride, polyamide, polyethylene, polypropylene, polystyrene, silicone, or the like, the porous high polymer material having randomly located minute pores each having a diameter of about 0.5 microns or less, and a nematic or smectic liquid crystal, which exhibits a liquid crystal phase at room temperature and has a high volume resistivity, the nematic or smectic liquid crystal being sealed in those randomly located minute pores of the porous high polymer material.

If the randomly located minute pores are of a relatively large diameter, then an orientation pattern of the liquid crystal which is developed in the high polymer - liquid crystal compound membrane depending on an applied electric field that corresponds to an optical image remains unchanged insofar as the applied electric field exists. When the electric field is removed, the liquid crystal in the high polymer - liquid crystal compound membrane is brought into an isotropic phase, eliminating the orientation pattern. Therefore, the high polymer - liquid crystal compound membrane exhibits the property of the material (a). If the randomly located minute pores are of a relatively small diameter, then the high polymer - liquid crystal compound membrane exhibits the property of the material (b).

In the case where the high polymer - liquid crystal compound membrane exhibits the properties of the material (a), an insulation layer may be superposed on the high polymer - liquid crystal compound membrane. Since an electric field developed by an electric charge image stored in the insulation layer is applied to the recording layer over a long period of time, the light modulating layer can be used as a recording layer which functions as a memory operable by the combination of the insulation layer and the high polymer-liquid crystal compound membrane.

If the randomly located minute pores are of a relatively small diameter, then the high polymer - liquid crystal compound membrane exhibits the property of the material (b).

In the case where the high polymer - liquid crystal compound membrane exhibits the properties of the material (b), when an electric field whose intensity depends on the electric charge distribution of an electric charge image is applied to the high polymer - liquid crystal compound membrane which operates in a dispersion mode, an orientation pattern of the liquid crystal corresponding to the applied electric field is developed in the high polymer - liquid crystal compound membrane. The developed orientation pattern of the liquid crystal, which is sealed in the pores, remains stored in the high polymer - liquid crystal compound membrane even after the electric field is removed. Therefore, the high polymer - liquid crystal compound membrane functions as a memory by itself.

More specifically, the liquid crystal has molecules sealed in the minute pores of the high polymer - liquid crystal compound membrane. The sealed liquid crystal molecules are subject to forces from the surfaces of the walls of the minute pores. Since stronger forces are applied from the wall surfaces of the minute pores to those liquid crystal molecules which are positioned more closely to the wall surfaces, the liquid crystal molecules are subject to stronger forces from the wall surfaces as the diameter of the minute pores is smaller. When the liquid crystal molecules sealed in the minute pores are placed in an electric field whose intensity is higher than a certain threshold, the liquid crystal molecules are oriented in the direction of the electric field against the forces applied from the wall surfaces of the minute pores.

The degree to which the liquid crystal molecules are oriented under the applied electric field varies with the strength of the electric field. If the applied electric field is weaker, only those liquid crystal molecules which are subject to weaker forces from the wall surfaces, i.e., are positioned more closely to the center of the pores, are oriented in the direction of the electric field. As the strength of the applied electric field becomes stronger, those liquid crystal molecules which are subject to stronger forces from the wall surfaces, i.e., are positioned more closely to the wall surfaces, are also oriented in the direction of the electric field.

Therefore, when the molecules of the liquid crystal, e.g., of nematic or smectic phase, which are sealed the small-diameter minute pores in the porous high polymer material of the high polymer - liquid crystal compound membrane are subjected to an electric field, the molecules are oriented in the direction of the electric field against the forces from the wall surfaces of the pores. Once the molecules are oriented under the applied electric field, they are then held in the oriented angular position under the forces from the wall surfaces. Therefore, even after the applied electric field is removed, the liquid crystal molecules remain oriented, thus memorizing the pattern in which they are oriented depending on the applied electric field.

The memorized orientation pattern, which corresponds to the optical information applied to the photoconductive layer of the information recording medium, can be removed when the liquid crystal in the high polymer - liquid crystal compound membrane is melted into an isotropic phase by being heated to a temperature between the melting point of the liquid crystal and the melting point of the high polymer material. As time elapses thereafter, the melted liquid crystal is turned into a nematic or smectic phase, which is rendered opaque thereby removing the memorized orientation pattern.

To remove or erase any memorized molecular orientation from the recording layer in such a manner, the information recording medium may have a heating layer which may be supplied with electric energy to heat the recording layer for molecular orientation removal. Alternatively, memorized molecular orientation patterns may be erased from the recording layer by applying an intensive electric field to the recording layer.

Figure 3:
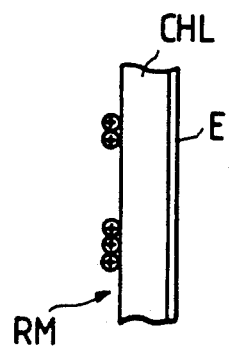
FIG. 3 through 16 are schematic views of different schemes by which image information is recorded on an information recording medium.
Figure 4:
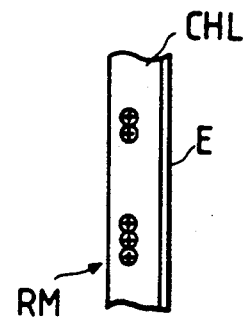

FIGS. 3 and 4 schematically show the manner in which optical information corresponding to an optical image of a subject is recorded as an electric charge image in an information recording medium including a charge storage layer.

In FIG. 3, an information recording medium RM comprises a charge storage layer CHL in the form of a membrane made of a material having a high electric resistance, and an electrode E attached to one side of the charge storage layer CHL. Electric charges, indicated by encircled plus signs, of an electric charge image are stored on the surface of the charge storage layer CHL remote from the electrode E.

In FIG. 4, an information recording medium RM comprises a charge storage layer CHL in the form of a membrane made of a material having a high electric resistance with charge holding particles dispersed therein, and an electrode E attached to one side of the charge storage layer CHL. Electric charges, indicated by encircled plus signs, of an electric charge image are stored in the charge storage layer CHL.

For more specific details of the information recording mediums shown in FIGS. 3 and 4, reference should be made to Japanese Patent Application No. 63-289707 (filed Nov. 16, 1988).

Figure 5:
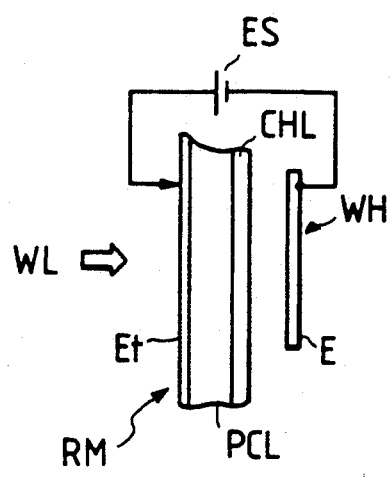
Figure 6:
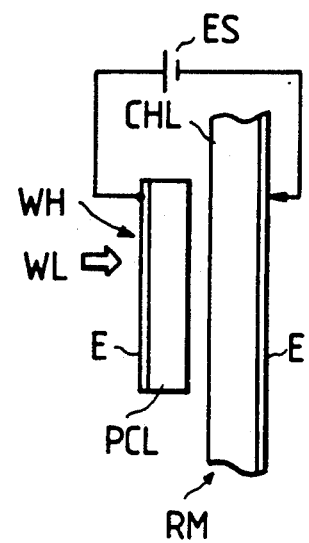

FIGS. 5 and 6 schematically illustrate recording arrangements each employing an information recording medium that includes a charge storage layer.

The recording arrangement shown in FIG. 5 comprises an information recording medium RM having a photoconductive layer PCL, a charge storage layer CHL disposed on one surface of the photoconductive layer PCL, and an electrode Et disposed on the other surface of the photoconductive layer PCL. The recording arrangement also includes an image write head WH having an electrode E spaced from the charge storage layer CHL. A voltage source or power supply ES is connected between the electrodes Et, E for applying a voltage to develop an electric field between the electrodes E, Et.

In operation, while a voltage is being applied by the power supply ES, developing an electric field between the electrodes Et, E which is required to record desired optical information in the charge storage layer CHL, light WL from a subject, which light is representative of an optical image of the subject, is focused on the photoconductive layer PCL by a lens (not shown in FIG. 5). The electric resistance of the photoconductive layer PCL varies depending on the intensity of the applied light. Therefore, the photoconductive layer PCL has different electric resistance values corresponding to respective light intensities from the subject. Because of the different electric resistance values of the photoconductive layer PCL, the surface of the charge storage layer CHL which is spaced from the electrode E develops an electric charge image corresponding to the optical image of the subject owing to an electric discharge between the electrode E and the charge storage layer CHL.

The recording arrangement shown in FIG. 6 comprises an information recording medium RM having a charge storage layer CHL and an electrode Et disposed on the charge storage layer CHL. The recording arrangement also includes an image write head WH having a photoconductive layer PCL spaced from the charge storage layer CHL and an electrode Et disposed on one surface of the photoconductive layer PCL remote from the charge storage layer CHL. A voltage source or power supply ES is connected between the electrodes Et, E for applying a voltage to develop an electric field between the electrodes Et, E.

In operation, while a voltage is being applied by the power supply ES, developing an electric field between the electrodes Et, E which is required to record desired optical information in the charge storage layer CHL, light WL from a subject, which light is representative of an optical image of the subject, is focused on the photoconductive layer PCL by a lens (not shown in FIG. 6). The electric resistance of the photoconductive layer PCL varies depending on the intensity of the applied light. Therefore, the photoconductive layer PCL has different electric resistance values corresponding to respective light intensities from the subject. Because of the different electric resistance values of the photoconductive layer PCL, the surface of the charge storage layer CHL which is spaced from the photoconductive layer PCL develops an electric charge image corresponding to the optical image of the subject owing to an electric discharge between the photoconductive layer PCL and the charge storage layer CHL.

In each of the recording devices shown in FIGS. 5 and 6, the image write head WH may be of a laminated structure including a glass substrate. If the electrodes Et, E are positioned such that they should pass light therethrough, they should be of such spectral transmittance characteristics that they pass light in a wavelength band for optical images to be recorded.

The photoconductive layer PCL is made of a photoconductive material such as amorphous silicon which is capable of generating a high fine electric charge image on one surface when a highly fine optical image is focused on the other surface while an electric field of certain strength is being applied to the photoconductive layer PCL.

Figure 7:
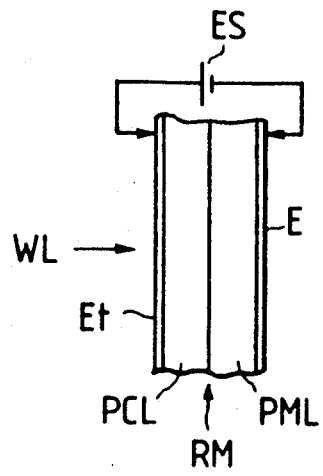
Figure 8:
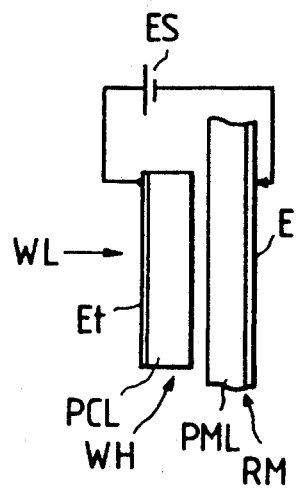
Figure 9:
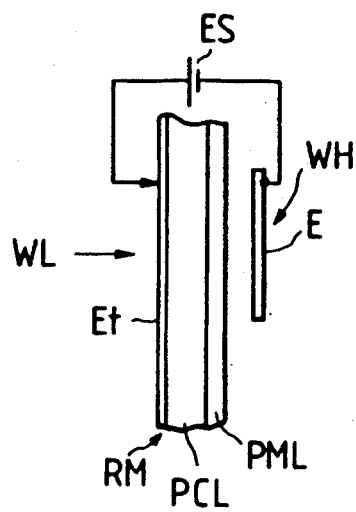

FIGS. 7, 8, and 9 schematically show recording arrangements each employing an information recording medium that includes a light modulating layer.

The recording arrangement shown in FIG. 7 includes an information recording medium RM which comprises a photo conductive layer PCL, an electrode Et disposed on one surface of the photoconductive layer PCL, a light modulating layer PML disposed on the other surface of the photoconductive layer PCL, and an electrode E disposed on the surface of the light modulating layer PML remotely from the photoconductive layer PCL. The electrodes Et, E are connected to a power supply ES.

The recording arrangement shown in FIG. 7 operates as follows: While a voltage is being applied by the power supply ES, developing an electric field between the electrodes Et, E which is required to record desired optical information in the charge storage layer CHL, light WL from a subject, which light is representative of an optical image of the subject, is focused on the photoconductive layer PCL by a lens (not shown in FIG. 7). The electric resistance of the photoconductive layer PCL varies depending on the intensity of the applied light. Therefore, the photoconductive layer PCL has different electric resistance values corresponding to respective light intensities from the subject. The different electric resistance values of the photoconductive layer PCL develop an electric charge image corresponding to the optical image of the subject in the surface of the photoconductive layer PCL which faces the light modulating layer PML, and an electric field resulting from the developed electric charge image is applied to the light modulating layer PML, whereupon the optical property of the material of the light modulating layer PML varies depending on the intensity of the applied electric field.

The recording arrangement shown in FIG. 8 differs from the recording arrangement shown in FIG. 7 in that the photoconductive layer PCL and the light modulating layer PML are spaced from each other. The electrode Et and the photoconductive layer PCL serve as an image write head WH.

The recording arrangement shown in FIG. 8 operates in substantially the same manner as the recording arrangement shown in FIG. 7 except that an electric charge image corresponding to the optical image of the subject is developed in the surface of the light modulating layer PML under an electric discharge between the photoconductive layer PCL and the light modulating layer PML depending on the different electric resistance values of the photoconductive layer PCL, or an electric field resulting from an electric charge image in the surface of the photoconductive layer PCL is applied to the light modulating layer PML.

The recording arrangement shown in FIG. 9 differs from the recording arrangement shown in FIG. 7 in that the light modulating layer PML and the electrode E are spaced from each other. The electrode E serves as an image write head WH.

The recording arrangement shown in FIG. 9 operates in the same manner as the recording arrangement shown in FIG. 7.

In each of the recording arrangements shown in FIGS. 7, 8, and 9, the light modulating layer PML may be made of either the material (a) or the material (b) referred to above.

The recording arrangements shown in FIGS. 5 through 9 do not have any color separators, but should be combined with a color separator such as the trichromatic color separator CSA shown in FIG. 1 if a colored image is to be recorded.

FIGS. 10 through 16 show recording arrangements for recording colored images using striped color separation filters, rather than trichromatic color separators. In each of the recording arrangements shown in FIGS. 10 through 16, an information recording medium RM includes a recording layer IML which may be either a charge storage layer CHL or a light modulating layer PML.

Figure 10:
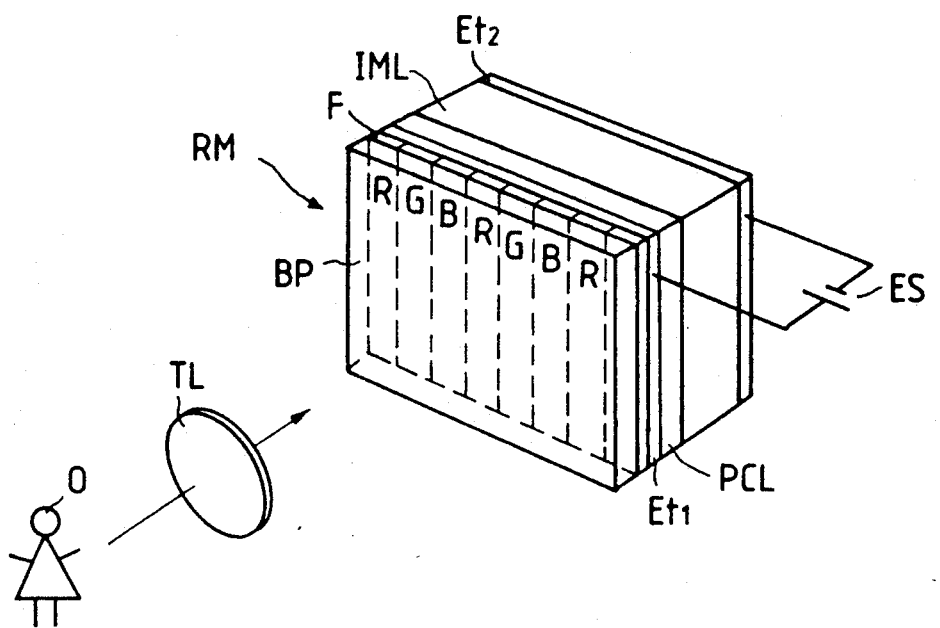

The recording arrangement shown in FIG. 10 comprises an information recording medium RM which includes a transparent substrate BP, a striped color separation filter F disposed on the substrate BP, an electrode Et1 disposed on the color separation filter F, a photoconductive layer PCL disposed on the electrode Et1, a recording layer IML disposed on the photoconductive layer PCL, and an electrode Et2. A power supply ES is connected between the electrodes Et1, Et2. The recording arrangement also includes a lens TL positioned in front of the information recording medium RM.

The striped color separation filter F comprises an array of alternate thin vertical red, green, and blue strips R, G, B. However, these filter elements R, G, B may be arranged in any of various repetitive patterns, such as a matrix of red, green, and blue dots.

Figure 11:
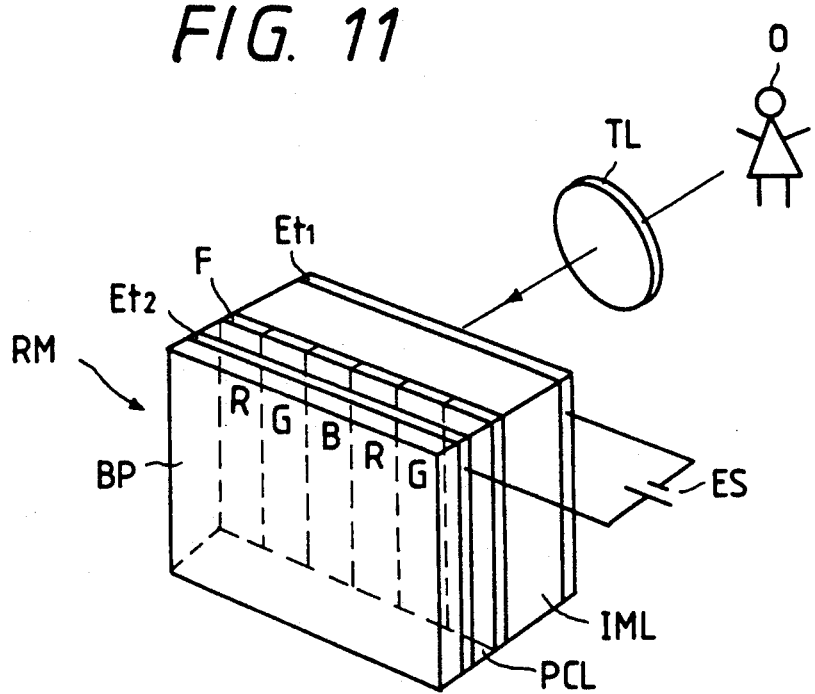

The recording arrangement shown in FIG. 11 comprises an information recording medium RM which includes a transparent substrate BP, an electrode Et2 disposed on the substrate BP, a photoconductive layer PCL disposed on the electrode Et2, a striped color separation filter F disposed on the photoconductive layer PCL, a recording layer IML disposed on the color separation filter F, and an electrode Et1 disposed on the recording layer IML. A power supply ES is connected between the electrodes Et2, Et1. The recording arrangement also includes a lens TL positioned in front of the electrode Et1.

Figure 12:
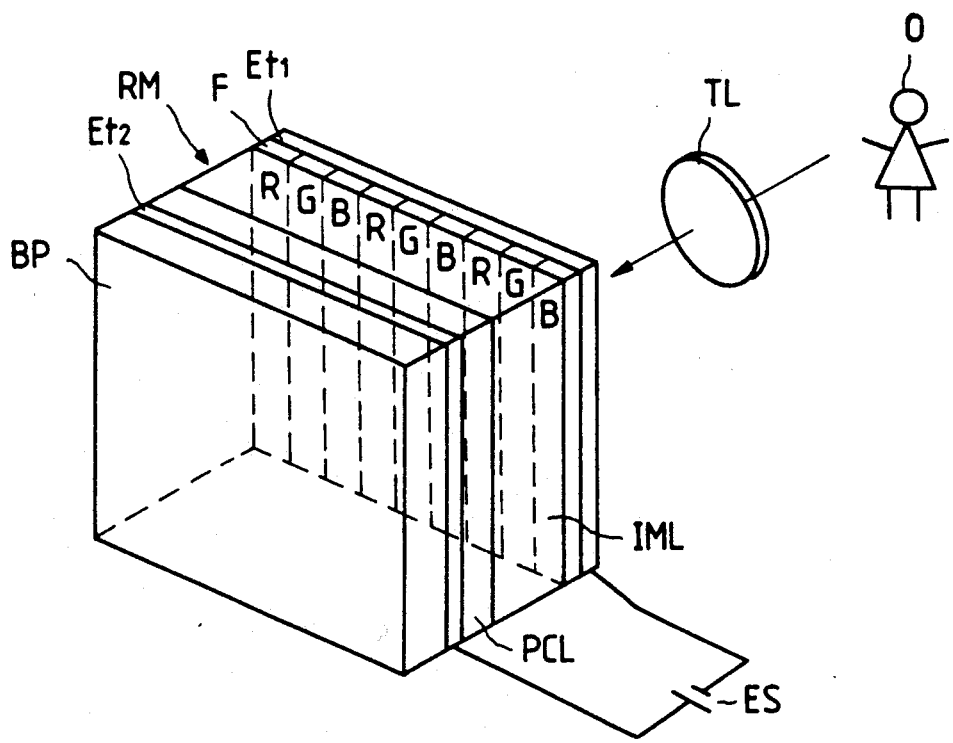

The recording arrangement shown in FIG. 12 differs from the recording arrangement shown in FIG. 11 in that the striped color separation filter F is disposed between the recording layer IML and the electrode Et1, rather than between the photoconductive layer PCL and the recording layer IML.

Figure 13:
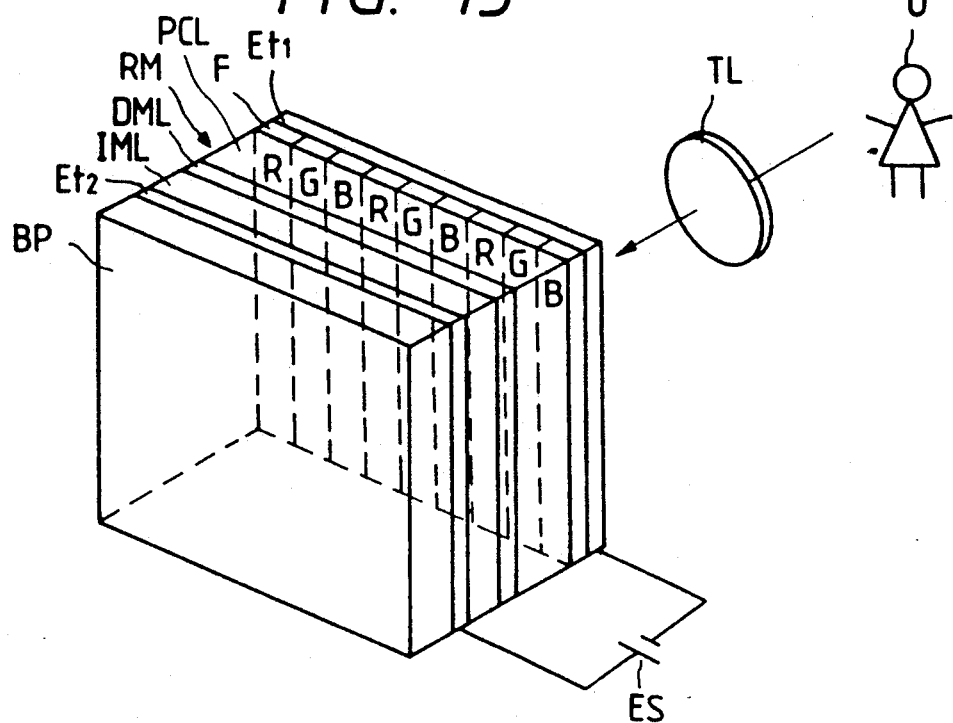

The recording arrangement shown in FIG. 13 comprises an information recording medium RM which includes a transparent substrate BP, an electrode Et2 disposed on the substrate BP, a recording layer IML disposed on the electrode Et2, a dielectric mirror DML disposed on the recording layer IML, a photoconductive layer PCL disposed on the dielectric mirror DML, a striped color separation filter F disposed on the photoconductive layer PCL, and an electrode Et1 disposed on the color separation filter F. A power supply ES is connected between the electrodes Et2, Et1. The recording arrangement also includes a lens TL positioned in front of the electrode Et1. The dielectric mirror DML comprises a multi-layer film of $SiO_2/TiO_2$, for example, and has a reflectance vs wavelength curve such that it has a larger reflectance with respect to a certain wavelength of light falling thereon.

Figure 14:
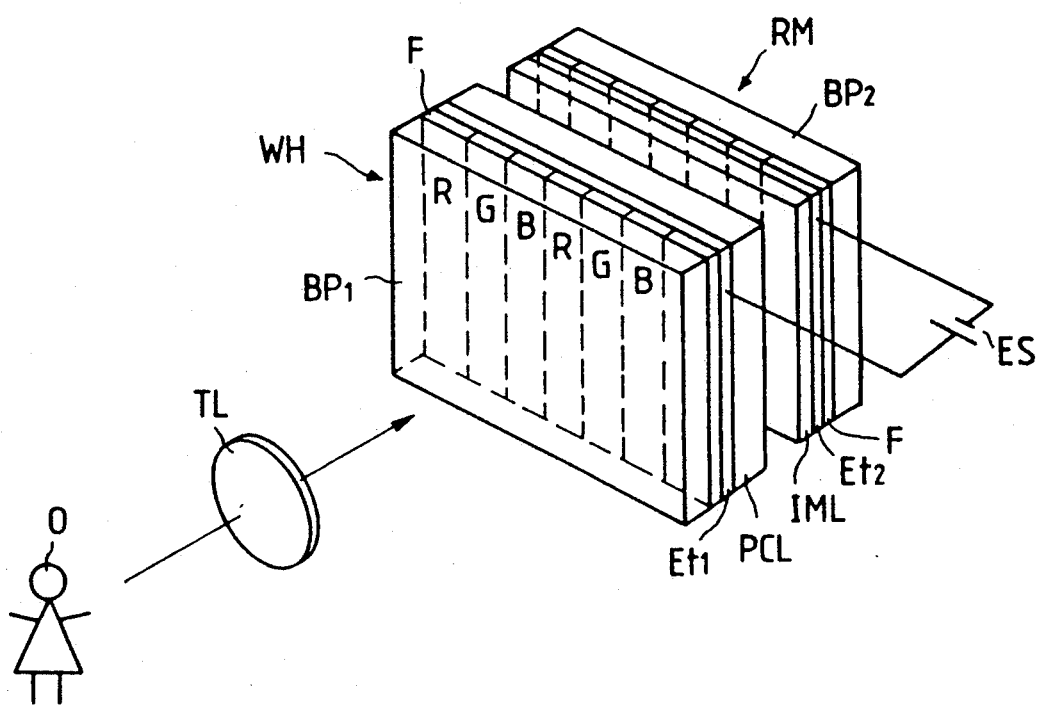

The recording arrangement shown in FIG. 14 comprises an image write head WH and an information recording medium RM spaced from the image write head WH. The image write head WH includes a transparent substrate BP1, a striped color separation filter F disposed on the substrate BP1, an electrode Et1 disposed on the color separation filter F, and a photoconductive layer PCL disposed on the electrode Et1. The information recording medium RM includes a recording layer IML facing and spaced from the photoconductive layer PCL of the image write head WH, an electrode Et2 disposed on the recording layer IML, a striped color separation filter F disposed on the electrode Et2, and a transparent substrate BP2 disposed on the color separation filter F. The electrodes Et1, Et2 are connected to a power supply ES. The recording arrangement also includes a lens TL positioned in front of the substrate BP1 of the image write head WH.

Figure 15:
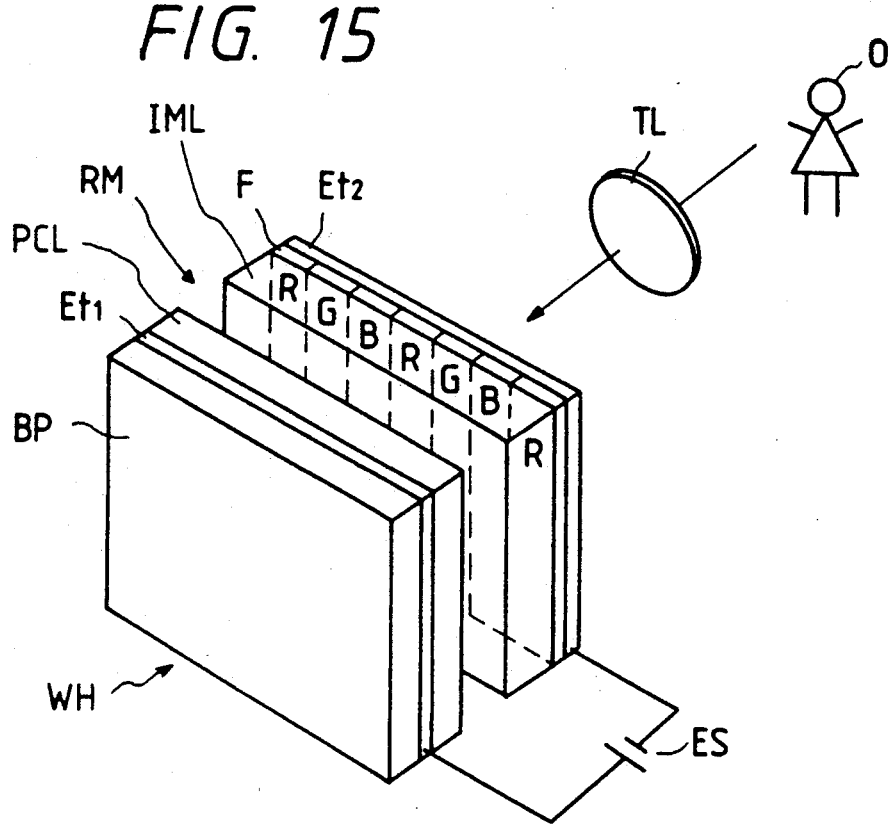

The recording arrangement shown in FIG. 15 also comprises an image write head WH and an information recording medium RM spaced from the image write head WH. The image write head WH includes a transparent substrate BP, an electrode Et1 disposed on the substrate BP, and a photoconductive layer PCL disposed on the electrode Et1. The information recording medium RM includes a recording layer IML facing and spaced from the photoconductive layer PCL of the image write head WH, a striped color separation filter F disposed on the recording layer IML, and an electrode Et2 disposed on the color separation filter F. The electrodes Et1, Et2 are connected to a power supply ES. The recording arrangement also includes a lens TL positioned in front of the electrode Et2 of the information recording medium RM.

Figure 16:
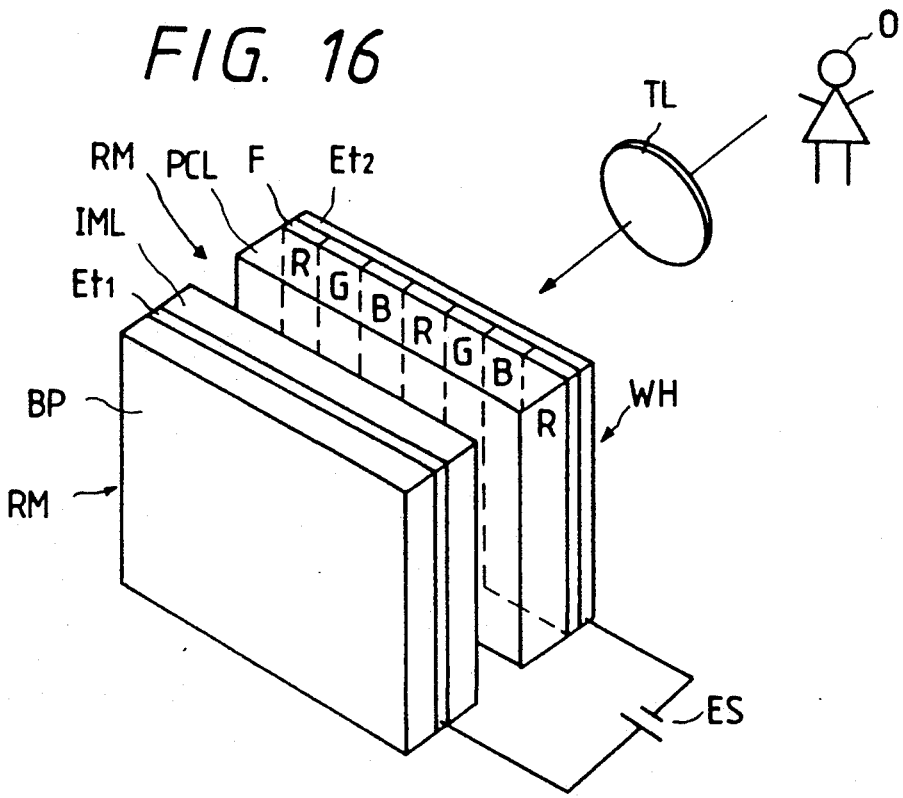

The recording arrangement shown in FIG. 16 also comprises an image write head WH and an information recording medium RM spaced from the image write head WH. The information recording layer RM includes a transparent substrate BP, an electrode Et1 disposed on the substrate BP, and a recording layer IML disposed on the electrode Et1. The image write head WH includes a photoconductive layer PCL facing and spaced from the recording layer IML of the information recording medium RM, a striped color separation filter F disposed on the photoconductive layer PCL, and an electrode Et2 disposed on the color separation filter F. The electrodes Et1, Et2 are connected to a power supply ES. The recording arrangement also includes a lens TL positioned in front of the electrode Et2 of the image write head WH.

The recording arrangements shown in FIGS. 10 through 16 operate in essentially the same manner as those shown in FIGS. 5 through 9. In each of the recording arrangements shown in FIGS. 10 through 13, light from a subject O is focused on the information recording medium RM, and image information corresponding to optical images separated by the color separation filter F in the information recording medium RM is recorded in the recording layer IML. In each of the recording arrangements shown in FIGS. 14 through 16, light from a subject 0 is focused on the image write head WH or the information recording medium RM, and image information corresponding to optical images separated by the color separation filter F in the image write head WH, or the information recording medium RM, or both is recorded in the recording layer IML.

Figure 17:
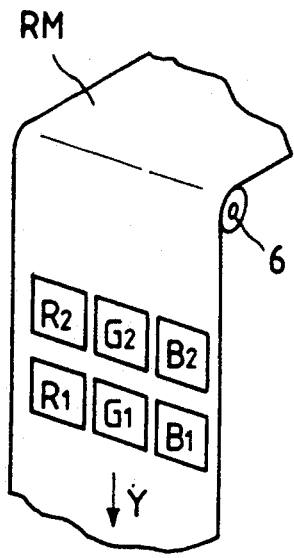
FIGS. 17 and 18 are fragmentary perspective views showing recording regions on elongate information recording mediums.
Figure 18:
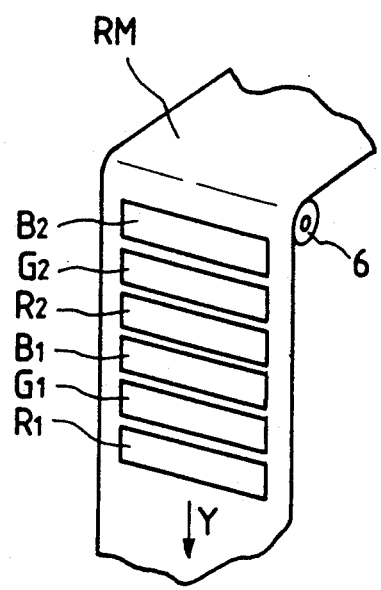

FIGS. 17 and 18 illustrate different patterns of recording regions on information recording mediums RM in the form of elongate strips for use in the recording arrangement shown in FIG. 1. In FIG. 17, while the information recording medium RM is intermittently fed in the direction indicated by the arrow Y, transversely juxtaposed optical images R1, G1, B1 of different colors, which are separated by the trichromatic color separator CSA, positioned as shown in FIG. 1, are recorded in one frame on the information recording medium RM, and then transversely juxtaposed optical images R2, G2, B2 of different colors are recorded in the next frame on the information recording medium RM. In this manner, optical images of different colors are recorded in successive frames on the information recording medium RM. In FIG. 18, while the information recording medium RM is intermittently fed in the direction indicated by the arrow Y, longitudinally juxtaposed optical images R1, G1, B1 of different colors, which are separated by the trichromatic color separator CSA, 90° turned from the position shown in FIG. 1, are recorded in one frame on the information recording medium RM, and then longitudinally juxtaposed optical images R2, G2, B2 of different colors are recorded in the next frame on the information recording medium RM. In this manner, optical images of different colors are recorded in successive frames on the information recording medium RM.

Figure 19:
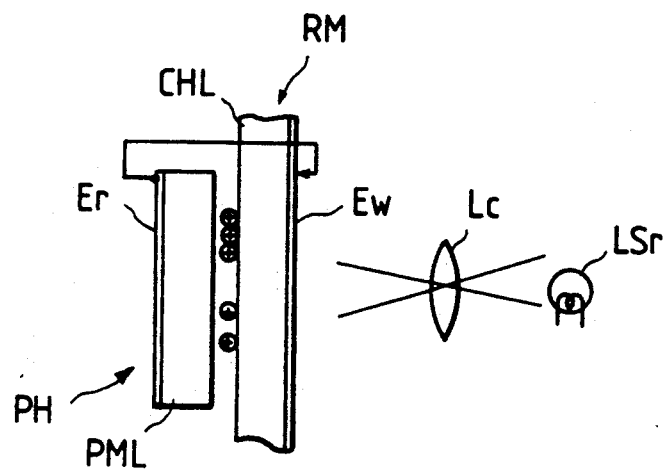
FIG. 19 is a schematic view illustrative of the manner in which recorded image information is reproduced.

FIG. 19 schematically shows the manner in which image information recorded in an information recording medium is reproduced by a reproducing system. In FIG. 19, the reproducing system includes an image read head RH and an information recording medium RM. The image read head RH comprises a transparent electrode Er and a light modulating layer PML disposed on the electrode Er. The information recording medium RM comprises a charge storage layer CHL as a recording layer, which faces and is spaced from the light modulating layer PML, and a transparent electrode Ew disposed on the charge storage layer CHL remotely from the image read head RH. The charge storage layer CHL stores an electric charge image which has been recorded therein in the manner described above with reference to FIGS. 5 through 20. A light source LSr for emitting reproducing light (reading light) is positioned in front of the electrode Ew with a lens Lc interposed therebetween.

In operation, reading light emitted from the light source LSr is applied through the lens Lc to the information recording medium RM. The light passes through the information recording medium RM and then through the light modulating layer PML and the electrode Er. At this time, since the light modulating layer PML has one surface closely facing the charge storage layer CHL, an electric field due to the electric charge image recorded in the charge storage layer CHL is applied to the light modulating layer PML, thus varying the optical property thereof in a pattern depending on the electric charge image. Therefore, the light that has passed through the light modulating layer PML varies depending on the varied optical property of the light modulating layer PML.

More specifically, if the light modulating layer PML is of a material which modifies the dispersion of light that passes therethrough depending on the intensity of an electric field applied thereto, then the intensity of the reading light having passed through the image read head RH is varied depending on the electric charge image recorded in the charge storage layer CHL. If the light modulating layer PML is of a material which modifies the birefringence or optical rotation of light that has passed therethrough depending on the intensity of an electric field applied thereto, then when linearly polarized reading light is applied to the information recording medium RM, the inclination of the plane of polarization of the reading light having passed through the image read head RH is varied depending on the electric charge image recorded in the charge storage layer CHL. By passing the light from the image read head RH through a polarizer, the light leaving the polarizer has an intensity modulated depending on the electric charge image recorded in the charge storage layer CHL.

If the information recording medium RM comprises a light modulating layer as the recording layer in FIG. 19, then no image read head is required to be combined with the information recording medium RM.

Figure 20:
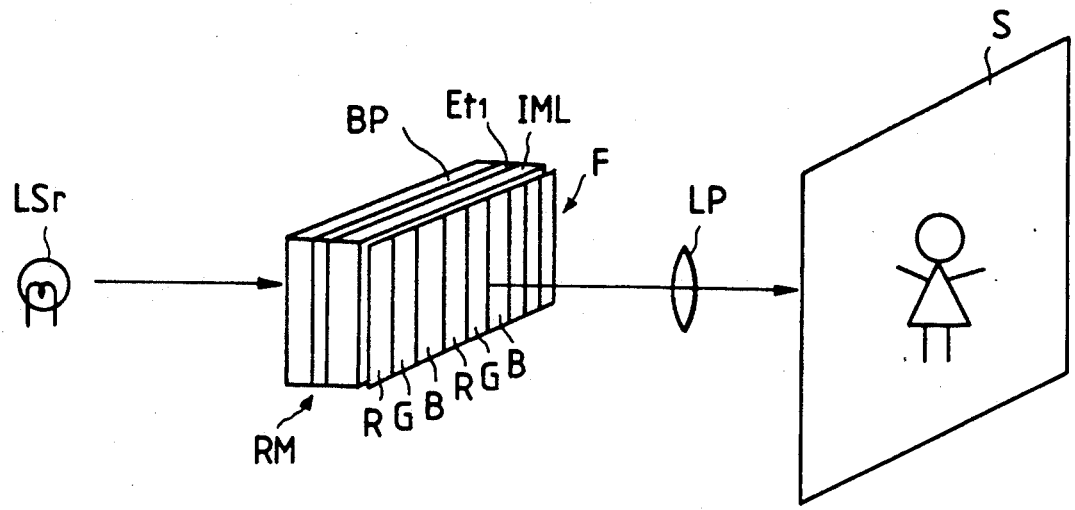
FIGS. 20 through 22 are schematic views of different schemes by which recorded image information is reproduced.
Figure 21:
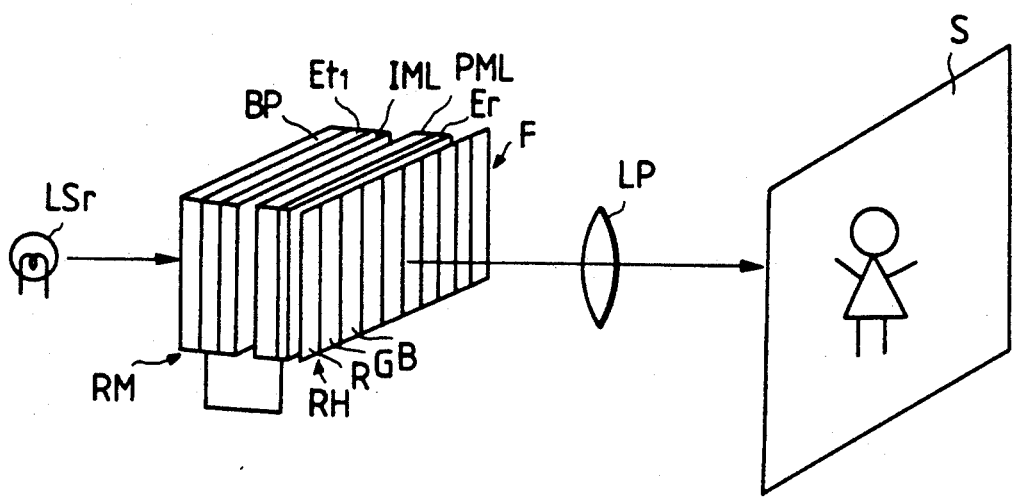
Figure 22:
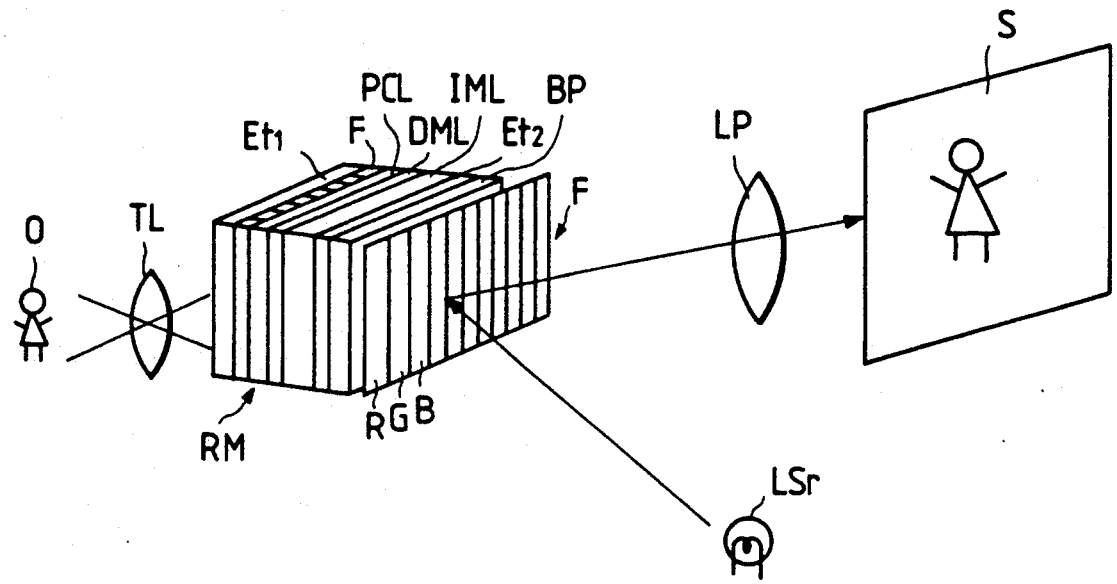

FIGS. 20 through 22 show specific reproducing arrangements for reproducing colored images.

The reproducing arrangement shown in FIG. 20 comprises an information recording medium RM which includes a transparent substrate BP, an electrode Et1 disposed on the substrate BP, a recording layer IML in which desired image information indicative of optical images of different colors is recorded, and a filter F disposed closely to and spaced from the recording layer IML. Reading light is emitted from a light source LSr positioned in front of the substrate BP and passes through the information recording medium RM. The light that has left the information recording medium RM is focused onto a screen S by a lens LP, reproducing a colored image indicative of the recorded image information on the screen S. In the embodiment shown in FIG. 20, the recording layer comprises a light modulating layer.

The reproducing arrangement shown in FIG. 21 comprises an information recording medium RM and an image read head RH spaced therefrom. The information recording medium RM comprises a transparent substrate BP, an electrode Et1 disposed on the substrate BP, and a charge storage layer CHL as a recording layer in which desired image information indicative of optical images of different colors is recorded. The image read head RH comprises a light modulating layer PML facing and spaced from the charge storage layer CHL of the information recording medium RM, and an electrode Er disposed on the light modulating layer PML. A filter F is disposed closely to and spaced from the light modulating layer PML. Reading light is emitted from a light source LSr positioned in front of the substrate BP and passes through the information recording medium RM and the image read head RH. The light that has left the image read head RH passes through a striped color separation filter F, and then is focused onto a screen S by a lens LP, reproducing a colored image indicative of the recorded image information on the screen S. The reproducing device shown in FIG. 21 is essentially the same as the arrangement shown in FIG. 20.

The reproducing arrangement shown in FIG. 22 includes an information recording medium RM which is identical to the information recording medium RM shown in FIG. 13. The reproducing arrangement further includes a striped color separation filter F disposed in front of and spaced from the transparent substrate BP. Reading light emitted from a light source LSr passes through the filter F, the substrate BP, the electrode Et2, and the recording layer IML to the dielectric mirror DML. Then, the light is reflected by the dielectric mirror DML and passe again through the recording layer IML, the electrode Et2, the substrate BP, and the filter F. At this time, the light is varied in its state depending on the image information recorded in the recording layer IML. The light which has left the filter F is focused onto a screen S by a lens LP, reproducing a colored image indicative of the recorded image information on the screen S. In the embodiment shown in FIG. 22, the recording layer IML comprises a light modulating layer.

Figure 23:
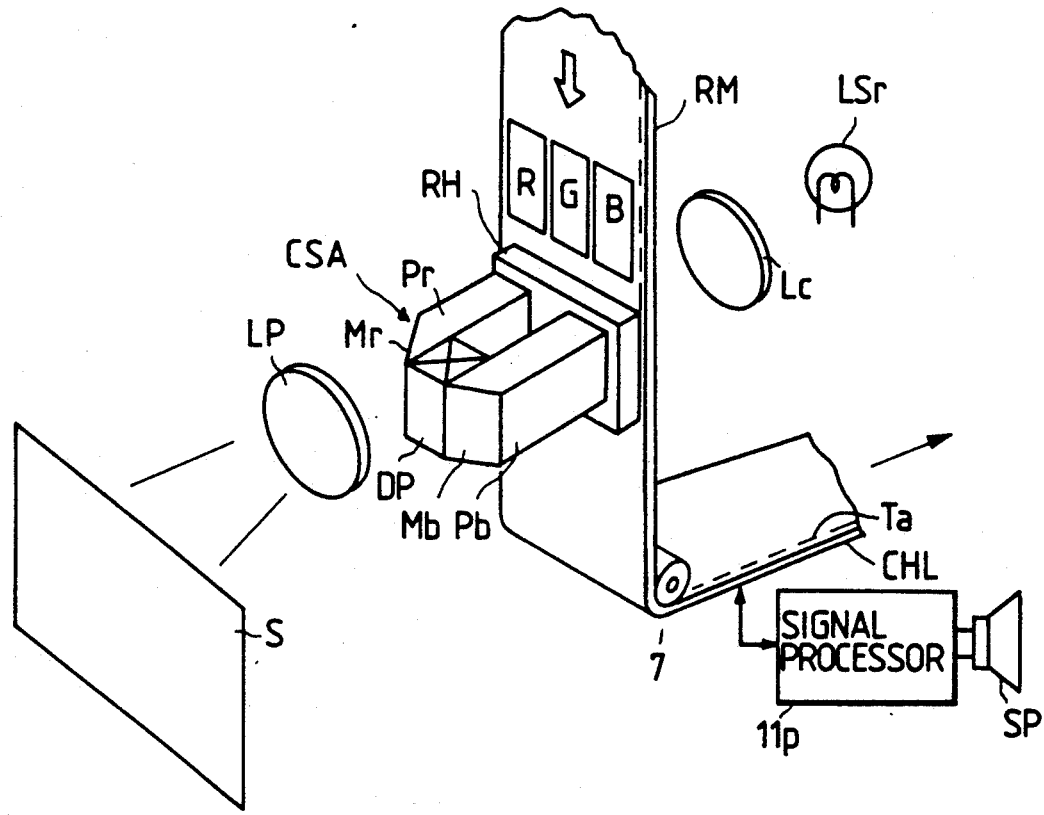
FIGS. 23 through 25 are schematic perspective views of different reproducing arrangements of the cinematographic system according to the present invention.
Figure 24:
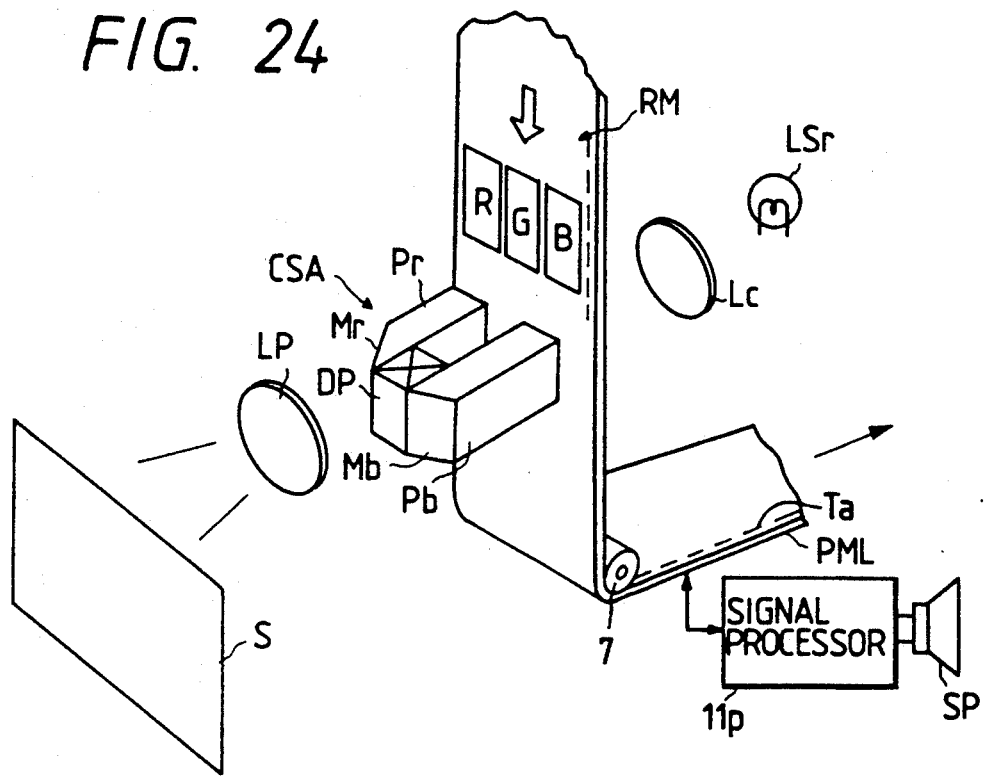
Figure 25:
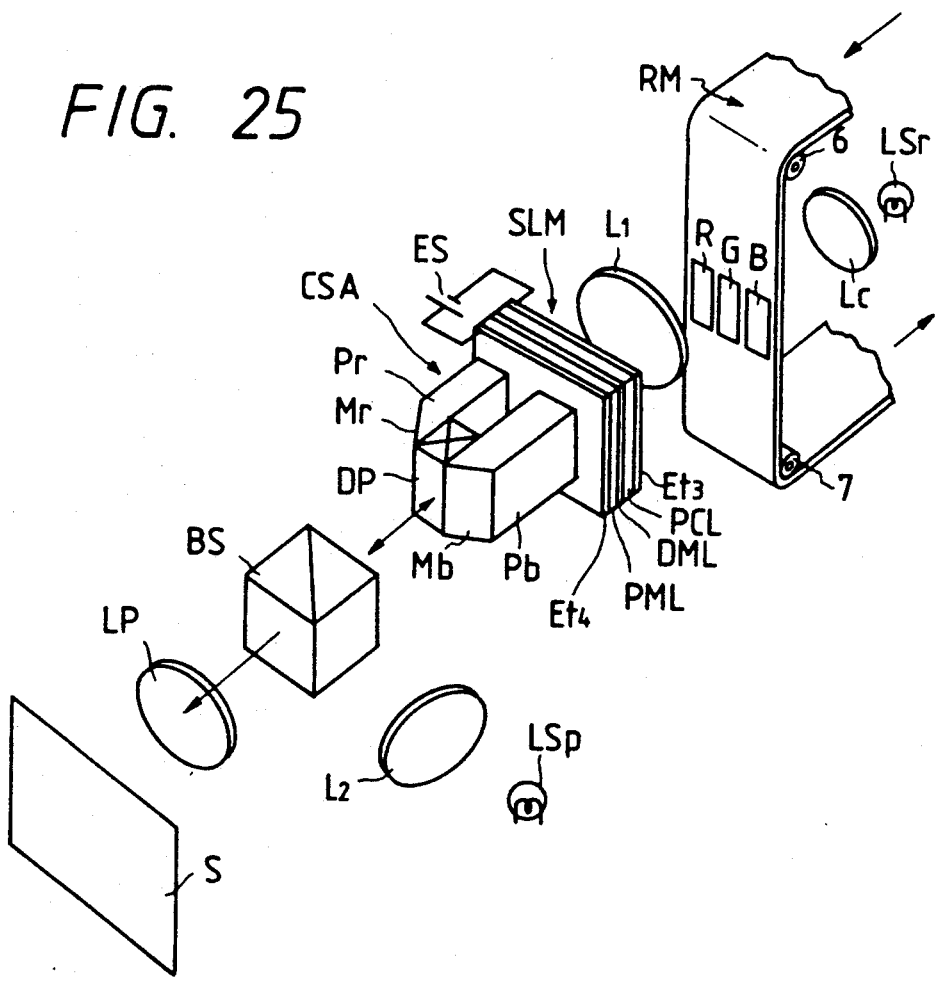

FIGS. 23 through 25 show different reproducing arrangements of the cinematographic system according to the present invention.

The reproducing arrangement shown in FIG. 23 comprises an information recording medium RM in the form of an elongate strip which stores image information of different colors in successive frames. The information recording medium RM is intermittently movable in its longitudinal direction by drive sprockets including a drive sprocket 7. The information recording medium RM includes a charge storage layer CHL. The reproducing arrangement also includes an image read head RH positioned immediately in front of the information recording medium RM. The image read head RH has a light modulating layer, and hence is similar to the image read head RH shown in FIG. 19. A trichromatic color separator CSA, which is identical to the trichromatic color separator CSA shown in FIG. 2, is disposed on the front surface of the image read head RH. The reproducing arrangement also has a signal processor 11p for reproducing recorded audio information from a marginal recording region Ta of the information recording medium RM. The signal processor 11p is connected to a loudspeaker SP which converts the audio signal into audible sounds.

While the information recording medium RM is being intermittently fed, reading light is emitted from a light source LSr and applied through a lens Lc to the information recording medium RM. The light then passes through the information recording medium RM to the image read head RH. When the light leaves the image read head RH, its intensity is modulated depending on the image information recorded as electric charge images in the information recording medium RM.

The modulated light, which now represents three optical images, then enters the trichromatic color separator CSA which combines the three optical images into one colored image that is thereafter focused onto a screen S by a lens LP. Since the information recording medium RM is intermittently fed in its longitudinal direction, a motion-picture image is displayed on the screen S.

The reproducing arrangement shown in FIG. 24 is similar to the reproducing arrangement shown in FIG. 23, except that the information recording medium RM includes a light modulating layer PML and hence n image read head is employed between the information recording medium RM and the trichromatic color separator CSA.

The reproducing arrangement shown in FIG. 25 essentially comprises an elongate information recording medium RM with successive frames of recorded image information, a reflective spatial light modulating device SLM, trichromatic color separator CSA, and a beam splitter BS. The reflective spatial light modulating device SLM comprises a transparent electrode Et3, a photo-conductive layer PCL disposed on the electrode Et3, a dielectric layer DML disposed on the photoconductive layer PCL, a dispersive light modulating layer PML disposed on the dielectric layer DML, and a transparent electrode Et4 disposed on the light modulating layer PML. The electrodes Et3, Et4 are connected to a power supply ES.

Light emitted from a light source LSr passes through a lens Lc, the information recording medium RM, and a lens L1 to the spatial light modulating device SLM. At this time, the light has different intensities depending on the image information recorded in the information recording medium RM. The light is applied through the electrode Et3 to the photoconductive layer PCL which is placed under an electric field produced between the electrodes Et3, Et4. Since the electric resistance of the photoconductive layer PCL is varied depending on the intensities of the applied light, electric charge images corresponding to the light intensities are produced in the interface between the photoconductive layer PCL and the dielectric mirror DML.

Reading light of a certain intensity is emitted from a light source L2 and deflected by the beam splitter BS to travel through the trichromatic color separator CSA, the electrode Et4, and the light modulating layer PML to the dielectric layer DML. The reading light is then reflected by the dielectric layer DML and passes again through the light modulating layer PML, the electrode Et4, and the trichromatic color separator CSA. At this time, the reading light is modulated in intensity depending on the electric charge images produced in the interface between the dielectric layer DML and the photoconductive layer PCL. Optical images represented by the modulated reading light are combined into one colored image by the trichromatic color separator CSA, and the light then passes through the beam splitter BS, and is focused as a motion-picture image on the screen S by a lens LP.

The reading light which is produced by the light source LSp may be greater in intensity than the writing light with which the image information has been recorded in the information recording medium RM. Therefore, the reflective spatial light modulating device SLM functions as a light amplifier for projecting bright high-contrast colored images onto the screen S even if the light having passed through the information recording medium is of relatively low intensity. Particularly, in order to avoid a reduction in the contrast of reproduced images due to the wavelength selectivity of the dispersive light modulating layer PML, the light emitted from the light source LSr should be low in intensity and in a narrow wavelength range (preferably of a single wavelength), and white light of high intensity should be emitted from the light source LSp. In this manner, bright high-contrast colored images can be reproduced on the screen S.

Although certain preferred embodiments have been shown and described, it should be understood that many changes and modifications may be made therein without departing from the scope of the appended claims.

We claim as our invention:
1. A cinematographic system:
an information recording medium including a charge storage layer for photoelectrically converting an optical image of a subject directly into an electric charge image and storing said electric charge image therein;
a light modulating layer disposed in facing relation to said charge storage layer for reproducing an optical image from said electric charge image which remains continuously stored in said charge storage layer after said optical image is reproduced; and projecting means for projecting the reproduced optical image onto a screen.

2. A cinematographic system according to claim 1, further comprising:

color separating means for separating the optical image of the subject into optical images of different colors, wherein said charge storage layer photoelectrically converts the optical images of different colors directly into electrical charge images; and color synthesizing means for combining reproduced optical images of different colors into a colored optical image.

3. A cinematographic system according to claim 2, wherein each of said color separating means and said color synthesizing means comprises a trichromatic color separator.

4. A cinematographic system according to claim 2, wherein each of said color separating means and said color synthesizing means comprises a striped color separation filter.

5. A cinematographic system comprising:

an information recording medium including a light modulating layer for photoelectrically converting an optical image of a subject directly into an electric charge image and storing image information under an electric field depending on said electric charge image therein;

reproducing means for reproducing an optical image from said image information which remains continuously stored in said light modulating layer after said optical image is reproduced; and projecting said means for projecting the reproduced optical image onto a screen.

6. A cinematographic system according to claim 5, further comprising:

color separating means for separating the optical image of the subject into optical images of different colors, the recording medium photoelectrically converting the optical images of different colors directly into electric charge images, wherein said reproducing means comprises color synthesizing means for combining reproduced optical images of different colors into a colored optical image.

7. A cinematographic system according to claim 6, wherein each of said color separating means and said color synthesizing means comprises a trichromatic color separator.

8. A cinematographic system according to claim 6, wherein each of said color separating means and said color synthesizing means comprises a striped color separation filter.

9. A cinematographic system according to claim 1, wherein said reproducing means comprises a spatial light modulating layer for reproducing said optical image.

10. A cinematographic system according to claim 5, wherein said reproducing means comprises a spatial light modulating layer for reproducing said optical image.

* * * * *